UNITED STATES PATENT OFFICE.

CHARLES O. THOMPSON, OF TERRE HAUTE, INDIANA, ASSIGNOR TO THE AVERY LACTATE COMPANY, OF PORTSMOUTH, NEW HAMPSHIRE.

MANUFACTURE OF LACTIC ACID AND LACTATES.

SPECIFICATION forming part of Letters Patent No. 290,284, dated December 18, 1883.

Application filed April 10, 1883. Renewed November 21, 1883. (No specimens.)

*To all whom it may concern:*

Be it known that I, CHARLES O. THOMPSON, of Terre Haute, in the county of Vigo, and in the State of Indiana, have invented certain new and useful Improvements in the Manufacture of Lactic Acid and the Lactates; and I do hereby declare that the following is a full, clear, and exact description thereof.

My invention relates to the manufacture of lactic acid and the lactates, and is in part an improvement on the process set forth in the patent granted to Chas. E. Avery on July 5, 1881, and numbered 243,827.

In carrying out the process set forth in the patent above named it was found that in practice the quantity of neutral lactate crystals obtained from a given quantity of any vegetable product which yields sugar or starch—such as cornmeal—was not as large as the percentage of starch in the meal, &c., would give reason to expect, and to remedy this is one principal object of my present improvement.

In the preliminary steps in obtaining the glucose from the meal, instead of merely subjecting the latter to the action of sulphuric acid in the ordinary way, I now first digest the meal in a wooden tub for from ten to fifteen hours in warm water, (say between 70° and 100° Fahrenheit, and in the proportion of about five hundred gallons of water to one ton of meal,) and by this means I obtain an additional yield of from five to eight per cent. of glucose from the same quantity of meal over the amount obtained by simply boiling the meal with the sulphuric acid without first digesting the former. For example, where with the old process a ton of meal would yield, say, one thousand pounds of glucose, by first digesting the meal I obtain, say, one thousand and fifty pounds or more. The sulphuric acid employed in obtaining the glucose from the meal is neutralized by carbonate of lime, in the usual manner and proportions. My next step before fermenting is to add to the glucose-liquor thus obtained, mixed as it still is with the nitrogenous matter and other residues of the meal, pure white glucose of commerce, in about the proportion of one hundred or one hundred and fifty pounds of added glucose, dissolved in about one hundred gallons of water, to the ton of meal originally employed, and then I ferment the whole, substantially in the manner and at the temperature described in Avery's patent, which is accomplished without any of the glucose, either original or added, remaining unfermented. In practice I do not necessarily add any separate nitrogenous matter, but may rely upon that already contained in the residues of the meal, which, as stated, is still mixed with its glucose, and I find that the same quantity of ferment previously employed in Avery's process will suffice to ferment the whole glucose, both original and added. I keep the solution during fermentation constantly neutral by adding thereto pure carbonate of lime, as described in said Avery's patent, only that I add an increased quantity of the carbonate of lime on account of the extra amount of lactic acid formed from the added glucose.

So far my present invention is a modification of that described in the Avery patent. I will now set forth the manner in which I obtain the marketable acid-crystals from the neutral crystals produced as hereinbefore set forth. Having obtained these neutral crystals in the manner above described, they are next digested with hot water, and filtered through any convenient form of mechanical filter, and the liquid resulting from this filtration is a dilute solution of neutral calcium lactate. To this solution I add sufficient sulphuric acid to combine with one-half of the lime which was previously combined with the lactic acid. The lime thus withdrawn forms, with the sulphuric acid, sulphate of lime. I now again filter, and the resulting liquid is a dilute solution of acid calcium lactate. This solution I concentrate. After concentration the liquid is set in a cold chamber, (never above 45° Fahrenheit,) and the acid calcium lactate crystallizes substantially solid, the slight amount of mother-liquor still remaining with the crystals being readily pressed out therefrom, and the acid-crystals are now ready for use.

I have described my improvement with special reference to the use of cornmeal, that being a cheap and desirable product for this manufacture; but it will be understood that I do not limit myself to this particular vegetable product, but may employ any amylaceous matter, as set forth in the patent on which this present invention is an improvement.

Having thus described my invention, what I claim as new, and desire to secure by Letters Patent, is—

1. The improvement in the method of forming neutral calcium-lactate crystals described, consisting in first digesting cornmeal or other amylaceous matter in warm water, then converting a portion of the same into glucose, and adding to this glucose-liquor still mixed with the nitrogenous matters and other residues of the meal, &c., pure white glucose dissolved in water, without increasing the nitrogenous matter, fermenting the same with lactic ferment, and neutralizing the lactic acid as it forms with carbonate of lime, substantially as set forth.

2. The method of obtaining acid-crystals from neutral calcium-lactate crystals, consisting in digesting the latter with hot water, mechanically filtering this solution, adding sulphuric acid thereto, again filtering and concentrating the last solution, and next setting the concentrated solution in a cold chamber to crystallize, substantially as set forth.

In testimony that I claim the foregoing I have hereunto set my hand, on this 4th day of April, 1883, in the presence of two witnesses.

CHARLES O. THOMPSON.

Witnesses:
H. G. UNDERWOOD,
J. SIDNEY BROWN.